(12) United States Patent
Flack (10) Patent No.: US 8,255,466 B2
(45) Date of Patent: Aug. 28, 2012

(54) INTELLIGENT MANAGEMENT OF APPLICATION CONNECTIVITY

(75) Inventor: Philip W. Flack, Leesburg, VA (US)

(73) Assignee: AOL Inc., Dulles, VA (US)

( * ) Notice: Subject to any disclaimer, the term of this patent is extended or adjusted under 35 U.S.C. 154(b) by 786 days.

(21) Appl. No.: 11/618,548

(22) Filed: Dec. 29, 2006

(65) Prior Publication Data

US 2008/0159175 A1 Jul. 3, 2008

(51) Int. Cl.
*G06F 15/16* (2006.01)
(52) U.S. Cl. ......... 709/206; 709/217; 709/219; 709/220
(58) Field of Classification Search .......... 709/206, 709/217, 218, 203, 219, 220, 221, 222, 223, 709/224
See application file for complete search history.

(56) References Cited

U.S. PATENT DOCUMENTS

| | | | |
|---|---|---|---|
| 5,878,221 A * | 3/1999 | Szkopek et al. | 709/218 |
| 7,424,526 B1 * | 9/2008 | Hansen et al. | 709/224 |
| 2003/0009537 A1 * | 1/2003 | Wang | 709/219 |
| 2004/0032876 A1 * | 2/2004 | Garg et al. | 370/443 |
| 2005/0122904 A1 * | 6/2005 | Kumar | 370/230 |
| 2005/0125512 A1 * | 6/2005 | Fuller et al. | 709/220 |
| 2006/0168081 A1 * | 7/2006 | Okada | 709/207 |
| 2007/0016659 A1 * | 1/2007 | Peck et al. | 709/220 |
| 2007/0061433 A1 * | 3/2007 | Reynolds et al. | 709/223 |
| 2007/0168458 A1 * | 7/2007 | Costa-Requena et al. | 709/217 |

* cited by examiner

*Primary Examiner* — Barbara Burgess
(74) *Attorney, Agent, or Firm* — Fish & Richardson P.C.

(57) ABSTRACT

Network connectivity is selectively established by monitoring, on a client, communications activity incident to accessing a network, the communications activity including a request to access the network. An application associated with the communications activity is be identified. A communications configuration associated with the application is accessed, the communications configuration indicating how the application is configured to access the network. Network connectivity is selectively established based on the communications configuration, and the application may be enabled to access the network to support the communications activity.

26 Claims, 7 Drawing Sheets

---

USER_SCREEN_NAME
The following represent the communications configurations being used for applications you have accessed in the preceding thirty days.

Please click HERE to confirm use of this configuration file.

Please click HERE to reject use of this communications configuration or click on the underlined title to revise the constituent setting.

<u>User Applications for which communications will be established</u>

<u>Instant messenger Settings</u> (110)
    Sent over Port 1016
    Received over Port 1017

<u>Mail Settings</u> (120)
    Sent over Port 1020
    Received over Port 1021
    Mailbox settings over Port 1022

<u>Web Settings</u> (130)
    Exchanged over Port 80

<u>Media player Settings</u> (140)
    Video Traffic over Port 1023

<u>Nonuser Applications which communications that do not establish network connectivity</u>
    OS Update over Port 1050
    Virus Protection Update over Port 1051
    Domain Name System over Port 53

<u>Unknown Applications</u>
Port 2001 (Unknown)
Port 2002 (believed to be shareware tool)

USER_SCREEN_NAME
The following represent the communications configurations being used for applications you have accessed in the preceding thirty days.

Please click HERE to confirm use of this configuration file.

Please click HERE to reject use of this communications configuration or click on the underlined title to revise the constituent setting.

User Applications for which communications will be established

Instant messenger Settings (110)
    Sent over Port 1016
    Received over Port 1017

Mail Settings (120)
    Sent over Port 1020
    Received over Port 1021
    Mailbox settings over Port 1022

Web Settings (130)
    Exchanged over Port 80

Media player Settings (140)
    Video Traffic over Port 1023

Nonuser Applications which communications that do not establish network connectivity
    OS Update over Port 1050
    Virus Protection Update over Port 1051
    Domain Name System over Port 53

Unknown Applications
Port 2001 (Unknown)
Port 2002 (believed to be shareware tool)

200

COMMUNICATIONS CONFIGURATION

Instant messenger Settings (110)
    Sent over Port 1020
    Received over Port 1021

Mail Settings (120)
    Mailbox settings over Port 1015 (NONUSER ACTIVITY) (HOST AGENT CAPABLE TO KEEP ALIVE CONNECTION)
    Sent over Port 1016
    Received over Port 1017

Operating System Settings
    Spyware Guard 1024 (NONUSER ACTIVITY)
    Updates 1025 (NONUSER ACTIVITY)

Web Settings (130)
    Exchanged over Port 80

Media player Settings (140)
    Video Traffic over Port 1023

| Application | Rule | Resource (If Applicable) |
|---|---|---|
| Web Browser | Web site rules | See Applicable rule |
| Instant Messenger | Connect | Low bandwidth interface |
| Email Application | Mail rules | See mail rules<br>Wait until 150 kb of messages. |

Rules
Mail rules
    Messages sent to PARTNER GROUP    Establish communications using dial up interface
    Messages sent as PRIORITY_MESSAGE    Establish communications using wireless broadband
    Messages sent to SUBSCRIBERS    Establish communications. Authorized to incur $X in charges.

Web site rules
    www.SECURE_EXTRANET.com    Establish communications over the broadband interface
    www.WEB_MAIL.com    Establish communications over dial up interface
    www.INDUSTRY_SITE.com    Establish communications using low bandwidth wireless interface.
    OTHER    Do not establish communications.

Fig. 5

INTELLIGENT MANAGEMENT OF APPLICATION CONNECTIVITY

TECHNICAL FIELD

This document relates to connectivity management.

BACKGROUND

A user may rely on multiple programs in accessing the Internet. For example, a user may access an electronic mail application to send electronic mail, a web browser to access Internet content, and an Instant Messaging application to exchange real-time communications.

SUMMARY

In one general aspect, network connectivity may be selectively established by monitoring, on a client, communications activity incident to accessing a network, the communications activity including a request to access the network. An application associated with the communications activity is identified. A communications configuration associated with the application is accessed, the communications configuration indicating how the application is configured to access the network. Network connectivity is selectively established based on the communications configuration, and the application is enabled to access the network to support the communications activity.

Implementations may include one or more of the following features. Identifying the application may include identifying a resource that originated the communications activity. Identifying the application may include identifying a remote resource to which the communications activity is intended as a destination. Accessing the communications configuration and selectively establishing the network connectivity based may include accessing a first setting to be used in response to identifying a first program as the application, accessing a second setting to be used in response to identifying a second program as the application, establishing network connectivity using the first setting in response to identifying communications activity related to the first program, and establishing network connectivity using the second setting that is different than the first setting in response to identifying communications activity related to the second program.

Accessing the first setting may include accessing a first instruction specifying that connectivity should not be established for the first program and accessing the second setting may include accessing a second instruction specifying that connectivity for the second program should be established using a first communications mode. Accessing the first setting may include accessing a first instruction specifying that connectivity should be established for the first program using a first communications mode and accessing the second setting may include accessing a second instruction specifying that connectivity for the second program should be established using a second communications mode that is different than the first communications mode. Establishing network connectivity using the first setting and establishing network connectivity using the second settings may include establishing network connectivity using the first setting at a first time and establishing network connectivity using the second settings at a second time that is different than the first time. The first program may be enabled to access the network based on network connectivity that has already been established for the second program. The first program may be blocked from accessing the network based on network connectivity that has already been established for the second program.

Network connectivity for the application may be blocked based on a determination that the communications configuration does not support establishing network connectivity. A default configuration may be used based on a determination that a communications configuration for the application cannot be accessed. Using the default configuration may include blocking network connectivity based on a determination that the communications configuration for the application cannot be accessed or the application cannot be identified.

Establishing the network connectivity may include establishing the network connectivity for a specified duration. Monitoring the communications activity may include identifying a protocol supporting the communications activity. Identifying the application may include receiving an indication of which protocols are being used and associated with a user activity, and using the indication of which protocols are being used to identify the application.

The application may include a user application and it may be determining whether the communications activity represents user actions within the user application. Determining whether the communications activity represents user actions within the user application may include determining whether the user actions generate visual feedback useful to the user in perceiving the user application. Selectively establishing network connectivity based on the communications configuration may include selecting a specified communications interface from among several communications interfaces based on an application of a rule in the communications configuration specifying that the specified communications interface should be used to support the communications activity.

Implementations of any of the techniques described may include a method or process, an apparatus or system, or computer software on a computer-accessible medium. The details of particular implementations are set forth below. Other features will be apparent from the description and drawings, and from the claims.

DETAILED DESCRIPTION

Users rely on a variety of access techniques in order to access desired content through, for example, the Internet. Often times, carriers and OSPs (online service providers) charge for access to the Internet to pay for dialup-fees and other costs associated with such access. Even when the user does not directly incur charges based on their access, the requirement to support communications needs can bring costs on those supporting the user. For example, an OSP offering a bank of dialup modems may incur costs, e.g., for the equipment and leased circuits. Furthermore, the OSP may desire to reduce the magnitude of costs by not installing more capacity than is required. In another example, a user accessing a wireless circuit-switched network through a cell phone plan desires to avoid increased and/or escalating costs (e.g., per-minute fees) associated with using the wireless circuit-switched network.

However, oftentimes, background and ambient processes, such as spyware protection and update tools generate small amounts of traffic. The requirement for network connectivity for this small amount of traffic may instruct a communications interface to preserve the "on" or "open" state, even though these processes usually do not represent mission critical communications or represent communications that may be exchanged at a later time when communications do not incur the same costs for the user. It might be better to establish and preserve connectivity for only selective user applications, such as those having a relatively high degree of user reliance on the network connectivity, for example, based on user actions that generate visual feedback useful to the user in perceiving the user application.

As a result, network connectivity may be selectively established by monitoring, on a client, communications activity incident to accessing a network, the communications activity including a request to access the network. An application associated with the communications activity may be identified. A communications configuration associated with the application may be accessed, the communications configuration indicating how the application is configured to access the network. Network connectivity may be selectively established based on the communications configuration, and the application may be enabled to access the network to support the communications activity.

For example, a client may route all communications for inspection through an internal gateway. The internal gateway may inspect IP packets and classify packets by port number (or by other information indicative of the purpose of the packet). The client then may access an activity profile that includes a list of packet classifications. For example, the activity profile may indicate that (1) packets using a first port number represent a user request to transmit a message, (2) packets using a second port number represent a user request to retrieve a message, and (3) packets using a third port number represent a "keep-alive" message generated by a background process.

The client then determines whether the communications activity represents user actions within a user application based on activity profile and in response to inspecting the IP packets. If the client determines that communications activity represents user actions, the client may establish network connectivity by, for example, establishing a dialup connection, so that the client may support the user activity within the user application. If not, the client may terminate the network connection or allow the network connection to expire upon the conclusion of a timer.

Figure 1:
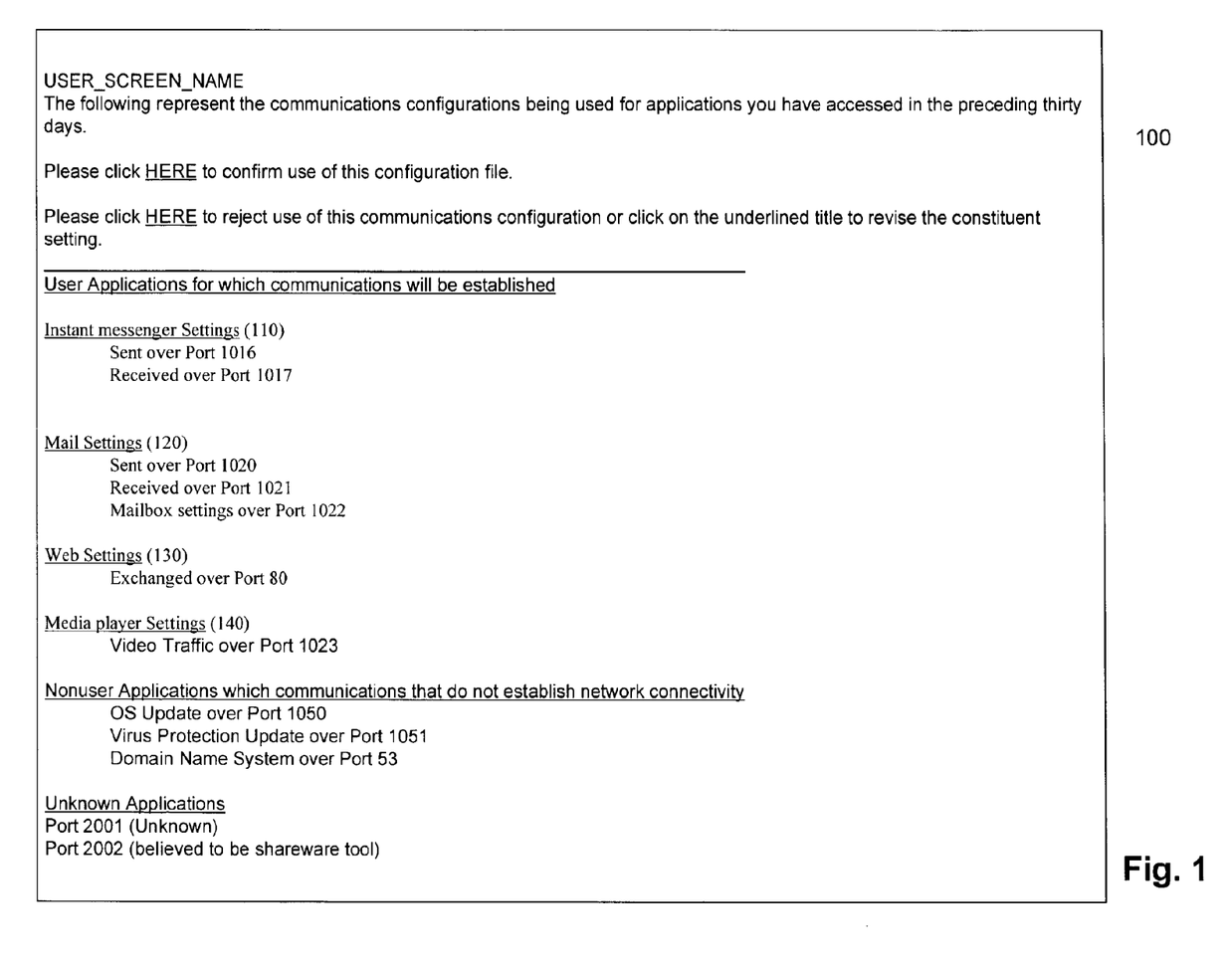
FIG. 1 is a Graphical User Interface (GUI) enabling a user to specify settings for network connectivity.

FIG. 1 is a Graphical User Interface 100 enabling a user to specify settings for network connectivity. These settings are referred to as a communications configuration. GUI 100 may be presented to a user so that the user may configure the activity profile. As shown, GUI 100 includes a display of indicating that a list of applications has been detected as being invoked in the preceding 30 days. In presenting the list of applications, GUI 100 includes instant messenger settings 110, mail settings 120, web settings 130, and media player settings 140 corresponding to each of the applications that has been identified as being used in the preceding 30 days.

Instant messenger settings 110 indicate that instant messages are transmitted over port 1016 and received over 1017. Note that the port number appears in a form enabling the user to change the setting by selecting the underlined title for the setting. In one implementation, the form enables a user to correct for discrepancies in indicated in the description of the traffic profile. For example, the client may fail to recognize that a particular user activity is associated with a different port (or multiple ports). Enabling the user to interact with the form to specify an activity profile may be used to increase the accuracy of the activity profile, and reduce the likelihood of errors resulting from a profile being incorrectly identified.

Mail settings 120 indicate that email messages are transmitted on port 1020 and received on 1021. Mail settings also has a "keep alive" protocol for the mailbox indicating that messages are periodically exchanged in order to "keep alive" a session with a mail server. System that preserve network connections in response to detecting network traffic may use mail box traffic to preserve the network connection even though costs may continue to be incurred and the "keep alive" traffic does not represent user activity. However, the user may select a "keep alive" control in order to instruct a system remote to the client (e.g., an access server or host) to maintain the connection as active even though the client is no longer able to respond to "keep alive" requests. Thus, a mail host interfacing with the access server may believe that the client actually is connected to the mail host because the access server has exchanged keep alive messages on behalf of the client even though the network connection has been disconnected. Enabling the host and/or client to perceive that the session is still active, even though connectivity in the intervening communications network has been terminated, may be used to avoid delays, additional computational burden, and increased network traffic associated with reestablishing a session. Thus, use of a host agent may enable a client and server to update only the necessary information since network connectivity was last established without requiring a more computationally burdensome synchronization.

Web settings 130 and media player settings 140 indicate that web traffic is sent on port 80 and video traffic is sent on port 1023. Finally, GUI 100 includes a "confirm" button enabling the user to confirm the activity profile (and thus load the activity profile) and a "reject" button enabling the user to reject to proposed activity profile. Rejecting the activity profile may use a default setting, for example, configured to preserve a network connection in response to detecting an exchange of communications through a communications interface.

GUI 100 also includes a list of nonuser applications that are authorized to communicate if access to a communications network is established, but not authorized to establish access to a communications network if access to the communications network is not established. As shown, the list of nonuser applications includes an OS update code segment being sent over port 1050, a virus definition updating code segment being sent over port 1051, and a Domain Name System (DNS) application resolving DNS names over port 53. The list of nonuser applications generally represents code segments that do not generate visual feedback useful to the user in perceiving the user application. For example, the OS Update code segment may represent an application that is designed to operate as a background process. Similarly, the virus definition updating code segment may represent a code segment that transparently ensures a virus scanning application is using the most current version of a virus scanning application. The code segment may be transparent in that the user need not even be aware that the code segment has been invoked or is active. Alternatively, the user display may enable the user to perceive that the code segment is active while not requiring user involvement.

As stated above, the list of nonuser applications are not authorized to establish access to a communications network by themselves. For example, an OS updater may be scheduled to check for updates once a day by polling an update server. In the event that the device with the OS updater does not currently have access to the network, a request by the OS updater cannot be used to establish access to a network. However, the list of nonuser applications may access a communications network once the communications network has been established. For example, a web browser may rely on a DNS application to resolve DNS queries. Similarly, the OS updater may use otherwise idle time to access the communications network. The OS updater also may be authorized to establish communications on a periodic basis (e.g. once per week) or using less expensive communications interfaces (e.g., an Ethernet connection).

GUI 100 also includes a list of unknown applications that includes a traffic profile for which an application cannot be identified. As shown, the list of unknown applications includes applications responsible for traffic appearing on port 2001 and port 2002. An unknown code segment is associated with port 2001 while a code segment believed to be associated with a shareware application is associated with port 2002.

Figure 2:
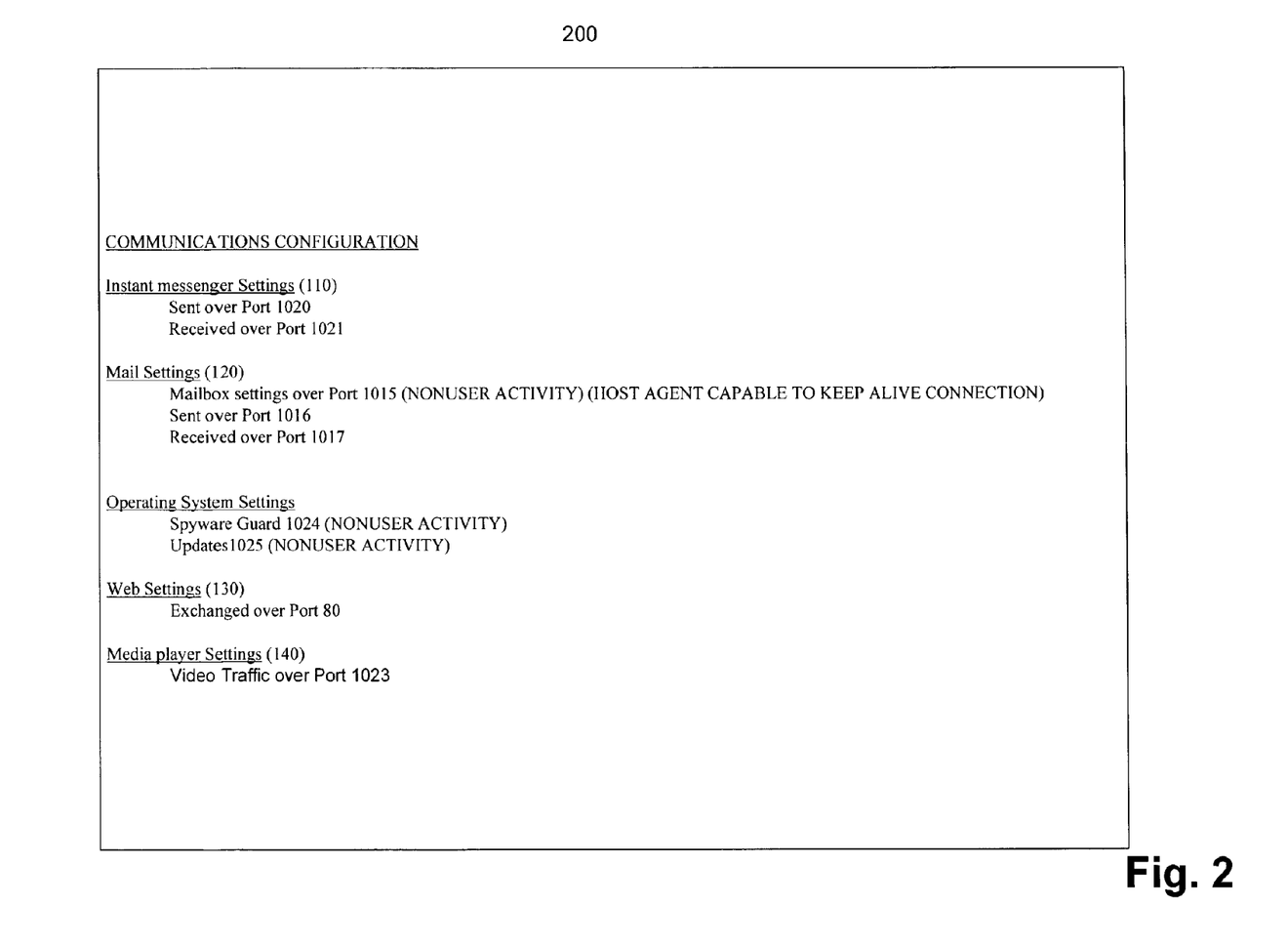
FIG. 2 is a table of network connectivity settings.

FIG. 2 is a table 200 of network connectivity settings. In one implementation, table 200 represents a communications configuration used by a client in selectively establishing network connectivity. Table 200 includes a list of applications (mail, instant messenger, Windows™, and Media Player) and a list of settings for each of the applications (port number, action, classification of user activity, an indication of whether a host agent may be used, and an indication of bandwidth required). Table 200 differs from GUI 100 in that table 200 represents communications configuration that may be accessed whereas GUI 100 represents a display rendered to a user. Note also that GUI 100 and table 200 use different traffic descriptions (e.g., port numbers) for some of the applications (e.g., email).

A client monitoring communications may reference table 200 (acting as a communications configuration) in order to selectively establish network communications should be selectively established. Mail settings 210 indicate that three ports are being used (1015, 1016, and 1017) for three different activities (mailbox, send message, and receive message). "Mailbox" communications do not represent user activities while "send message" and "receive message" are determined to represent user activities. A host agent may be used to reduce to communications burden in exchanging messages. A host agent represents a setting used to reduce the demand for communications services by scheduling newly sent and received messages to be sent at periodic intervals (e.g., every five minutes). Thus, a client using the "host agent" settings may store messages for up to five minutes and then briefly establish network communications while the messages are exchanged. Similarly, an access server may store messages intended for the user so that upon establishment of the network connection, the access server may transmit mail messages to the client.

Instant messenger setting 220 indicate that two ports (1020 and 1021) are being used to send and receive instant message, respectively. Both traffic types are associated with user activity.

Operating system settings 230 indicate that two processes (Spyware Guard and Updates) are associated with ports 1024 and 1025 and are being used by an operating system, but are not indicative of user activity. Media player settings 240 indicate that port 1023 is being used to play a file, and that playing a file represents user activity. The media player settings 240 indicate that a host agent may not be used and that the bandwidth required is high. The indication of bandwidth required may be used to instruct a network interface card to operate at a specified performance or setting. For example, a laptop may include a network interface card that operates at different bandwidths. Each of the bandwidths may be associated with different costs. The indication of bandwidth required may be used so that the least expensive setting for the network interface card is used.

Figure 2A:
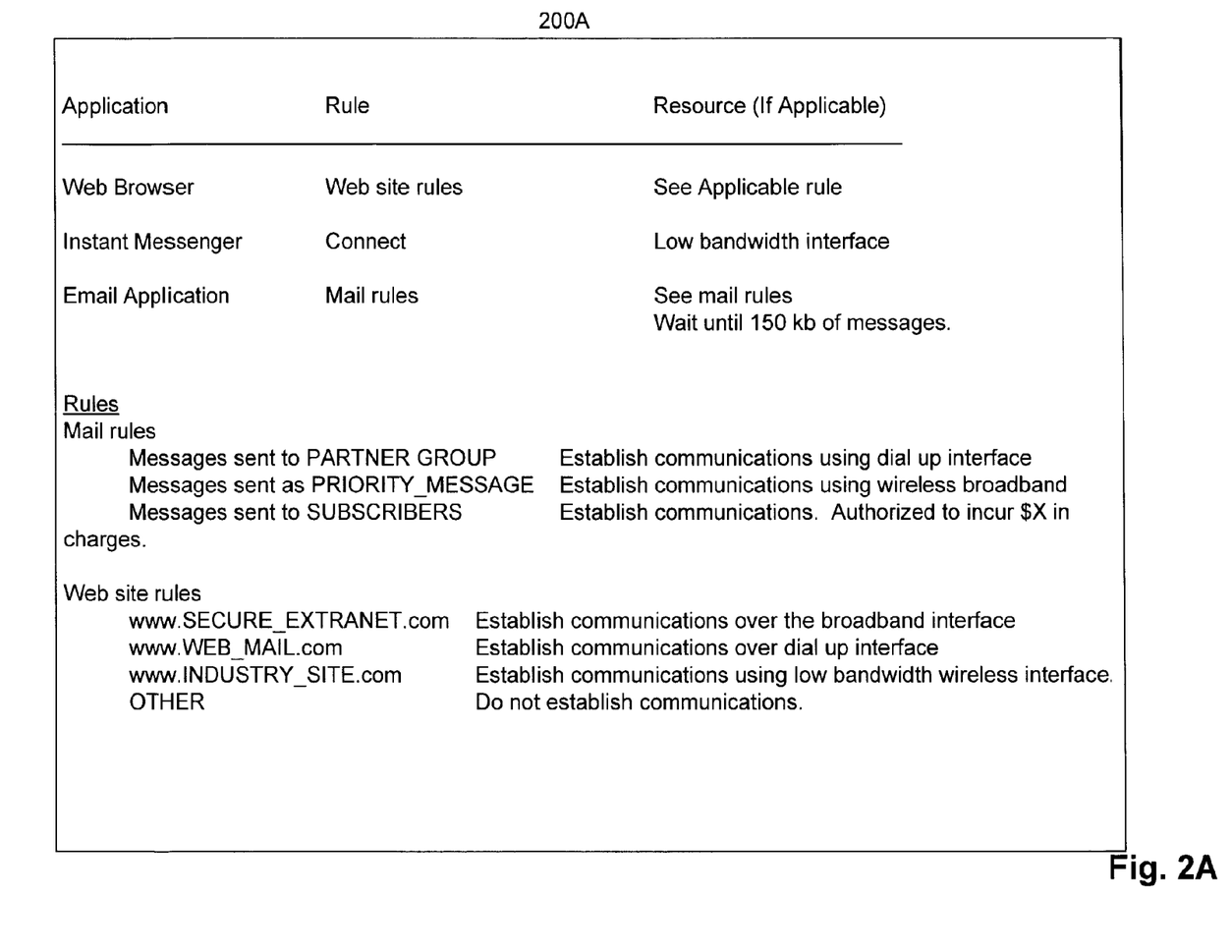
FIG. 2A is a GUI enabling a user to specify rules used in a communications configuration.

FIG. 2A is a GUI 200A enabling a user to specify rules used in a communications configuration. GUI 200A includes rules for a web browser, an email application, and an instant messaging application. GUI 200A illustrates how a communications configuration may be modified with rules enabling a granular focus. Specifically, GUI 200A indicates that web site rules should be used to control web browser, an instant messenger should connect using a low bandwidth interface, and an email application should consult applicable mail rules. In the event that criteria in the mail rules are not satisfied, communications should not be established until 150 kb of messages reside in a queue of messages to be sent.

The mail rules indicate that messages sent to users found in PARTNER_GROUP should be sent using a dial up interface. Messages sent with a priority designation (PRIORITY_MESSAGE) should be sent using a wireless broadband interface. Messages sent to SUBSCRIBERS may be used to establish communications. In the event that establishing communications incurs a cost, the client is authorized to incur $X in costs.

For example, PARTNER_GROUP may represent a collection of recipient email addresses for a company's strategic business partners (e.g., key suppliers). If an inspection engine on a client identifies the recipient as being a member of PARTNER_GROUP, the inspection engine may instruct a dial up modem to establish a connection. Priority messages may be identified through use of an importance parameter associated with a message header. An inspection engine may authorize use of a more costly interface (e.g., high speed wireless circuit-switched broadband) in support of such users.

The SUBSCRIBER rule enables $X in costs to be incurred so that a specified commitment level can be attained. Still, fixing a cost per communications requirement also enables an organization responsible for the costs to support deployed users in a more cost-deterministic manner. Note that the costs can be allocated across multiple communications platforms. For example, a business may authorize an executive traveling with a laptop to incur $100 in communications costs over the course of an international extensive business trip. The cost of communications may vary with the access technique used (e.g., landline dial up vs. 10 Base T Ethernet vs. wireless), the amount of traffic sent (e.g., per kb exchanged), per duration of connect time (e.g., per day or minute) and/or per bandwidth used (e.g., a low bandwidth wireless packet network may cost less than a high speed circuit-switched wireless network). The costs may be managed from the client, which receives an indication of the costs incurred from a carrier, or centrally from a host that selectively provides access based on the amount of "credit" available. In yet another configuration, a billing host may track expenses and periodically provide an indication of the remaining resources available for the client from the communications budget.

The web site rules enable a client to establish communications to a broadband network if www.SECURE_EXTRANET.com is being accessed, and establish communications over a dial up interface if www.WEB_MAIL.com is being accessed. If www.INDUSTRY_SITE.com is being accessed, communications are established using a low bandwidth wireless interface (e.g., 14.4 kbps access network). If other web sites are being accessed, access to communications networks is not authorized.

Figure 3:
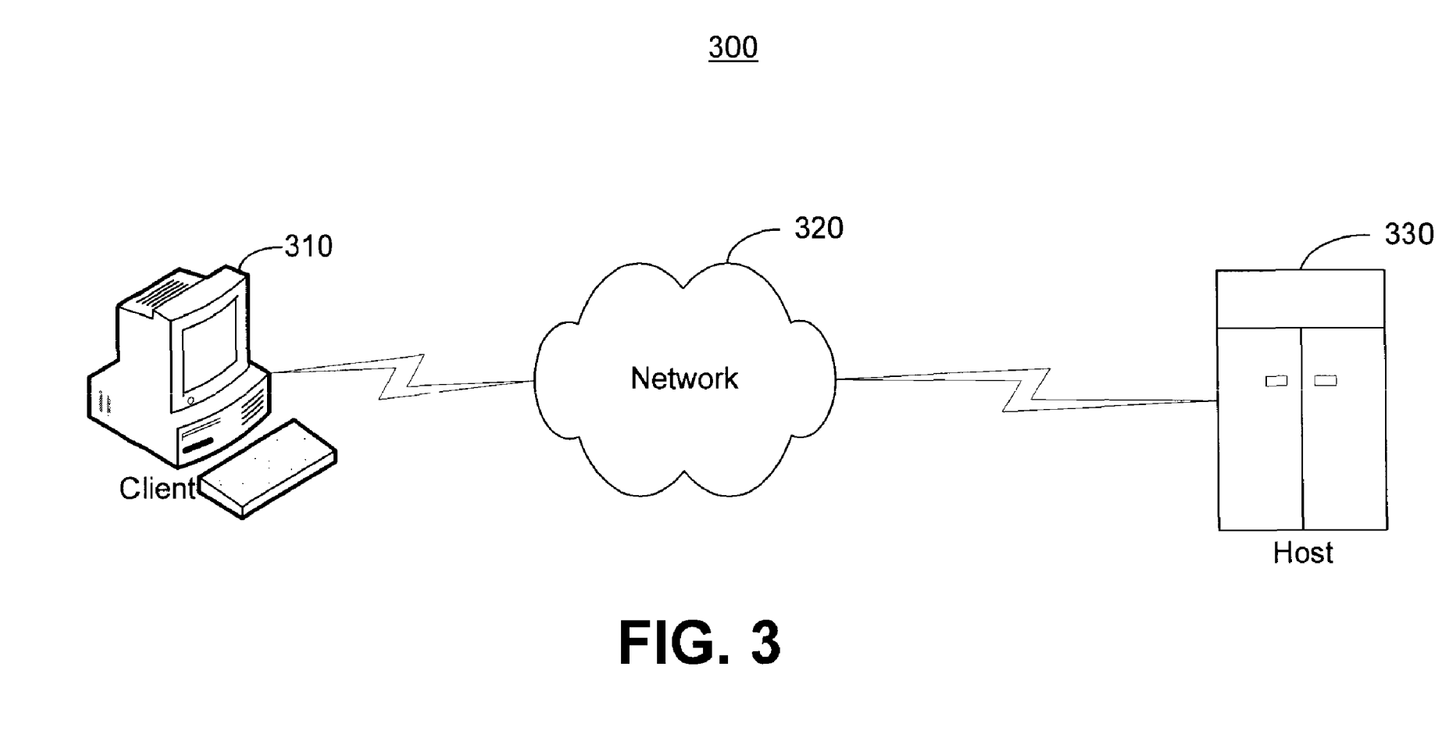
FIG. 3 is a block diagram of a communications system configured enabling a client to access a host across a network.

FIG. 3 is a block diagram of a communications system 300 configured enabling a client 310 to access a host 330 across a network 320. Generally, the client 310 is configured to access content on the host 330.

The client 310 may include one or more external interfaces from which the portable media device receives content. Typically, the external interface is used to receive electronic content and also software (e.g., firmware) that controls the operation of the portable media device. Examples of the external interface may include, but are not limited to, Universal Serial Bus (USB) and/or FireWire connections, wireless LAN interfaces (e.g., 802.11(a), (b), (g), or (n)), Personal Area Network connections (e.g., infrared or Bluetooth™), Wide Area Network connections, wireless phone connections, and/or proprietary interfaces. The external interface may be configured to exchange data with a client 310, host 330, and/or other portable media devices (not shown).

The client 310 typically includes a computing device enabling a user to exchange information over a communications network. The client 310 may include one or more devices capable of accessing content residing on client 310 and/or host 330. The client 310 may include a controller (not shown) that processes instructions received from or generated by a software application, a program, a piece of code, a device, a computer, a computer system, or a combination thereof, which independently or collectively direct operations of the client 310. The instructions may be embodied permanently or temporarily in any type of machine, component, equipment, storage medium, or propagated signal that is capable of being delivered to the client 310 or that may reside with the controller at client 310. Client 310 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 310 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities.

In another implementation, client 310 may include a wireless telephone running a micro-browser application on a reduced operating system with general purpose and specialized hardware capable of operating in mobile environments. The client 310 may include one or more media applications. For example, the client 310 may include a software application that enables the client 310 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The client 310 may include an inspection engine that regulates use of the different communications interfaces which may be available. For example, the client 310 may be configured to route all communications requests through the inspection engine. The inspection engine may reference a communications configuration and selectively enable access to a communications network based on the nature of the communications request and the communications configuration. The inspection engine may be used in an "armored" or trusted mode so that a communications interface may not be accessed without authorization from the inspection engine.

In one implementation, the different applications requiring use of a communications interface are required to register with the inspection engine. Registering with the inspection engine may permit a registered application to perceive transparent access the communications network even if access to the communications network is being selectively permitted. For example, a registered application may treat the inspection engine as an internal communications module used to exchange data. The inspection module then may queue or block communications based on rules in the communications configuration.

In another implementation, the inspection engine internally announces itself as the communications interface. Applications need not register with the inspection engine in order to communicate. However, the inspection engine may only establish communications in support of those communications described and authorized in the communications file.

The network 320 typically includes hardware and/or software capable of enabling direct or indirect communications between the client 310 and the host 330. As such, the network 320 may include a direct link between the client 310 and the host 330, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 330 generally includes one or more devices configured to distribute digital content. Typically, a host 330 includes a collection or library of content for distribution. Alternatively, or in addition, the host 330 may convert a media source (e.g., a video or audio feed) into a feed of data units for transmission across the network 320. The host 330 may include a general-purpose computer having a central processor unit (CPU), and memory/storage devices that store data and various programs such as an operating system and one or more application programs. Other examples of a host 330 includes a workstation, a server, a special purpose device or component, a broadcast system, other equipment, or some combination thereof capable of responding to and executing instructions in a defined manner. The host 330 also may include an input/output (I/O) device (e.g., video and audio input and conversion capability), and peripheral equipment such as a communications card or device (e.g., a modem or a network adapter) for exchanging data with the network 320.

The host 330 is generally capable of executing instructions under the command of a controller. The host 330 may be used to provide content to the client 310. The controller may be implemented by a software application loaded on the host 330 for commanding and directing communications exchanged with the client 310. Other examples of the controller include a program, a piece of code, an instruction, a device, a computer, a computer system, or a combination thereof, for independently or collectively instructing the client 310 or the host 330 to interact and operate as described. The host 330 may be embodied permanently or temporarily in any type of machine, component, physical or virtual equipment, storage medium, or propagated signal capable of providing instructions to the client 310 or the host 330.

The host 330 may be configured to store content for the client 310. In one implementation, the host 510 represents a central repository that stores a user's content. The host 510 then may be configured to enable user access to the user's library regardless of whether the user is using or is in proximity to a user's client. In another implementation, the host 330 represents a robust content store. The host 330 may be configured to provide Internet radio streams, enable a user to purchase a content selection, and enable access to promotional content.

Figure 4:
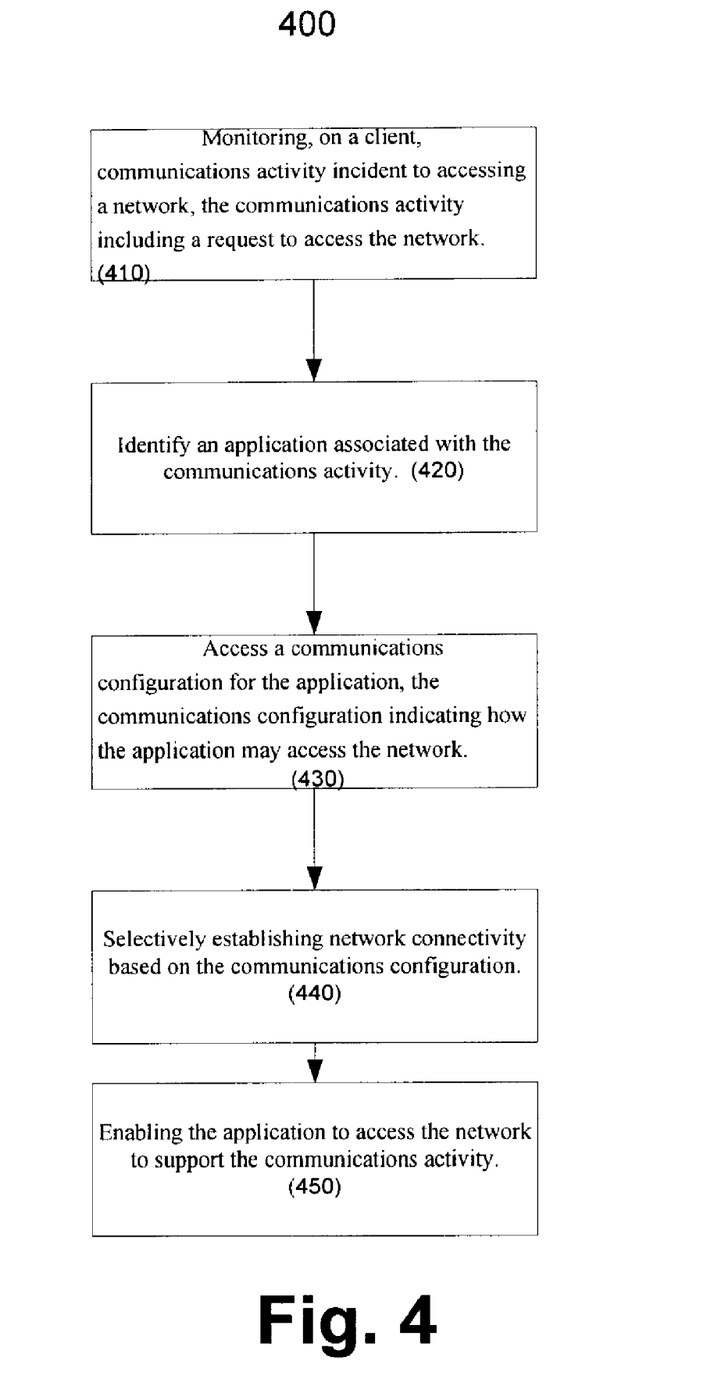
FIGS. 4, 4A and 5 are flow charts of processes by which connectivity is selectively established.

FIG. 4 is a flow chart 400 of a process by which network connectivity is selectively established. Although many of the operations are described as being performed on a client, the operations may be performed on other systems as well. For example, a wireless laptop may interface with a desktop computer used to manage communications throughout a home network. In yet another example, a personal computer interfaces with a gateway on a home router that decides whether and on what basis the personal computer may communicate.

Initially, a client monitors communications activity incident to accessing a network, the communications activity including a request to access the network. (410). For example, a client may route communications through an inspection engine, which inspects the communications. Inspecting the communications may include developing a description of the communications, such as the protocols appearing in the communications activity. For example, inspecting the communications may include identifying protocols used in the communications and identifying particular message types within the protocols being used. Although monitoring communications has been described as identifying the protocols (e.g., port numbers) used in the communications, other parameters may be monitored. For example, parameters within an applications layer may be monitored to identify message types.

The client identifies an application associated with the communications activity (420). Identifying an application may include identifying the source of a communications activity (or its destination on a remote system). For example, a client may have several hundred applications and processes that are installed, of which several dozen are active. Some of these applications may represent user applications that a user has launched in attempting to retrieve information from the Internet (e.g., a web browser, an email application, or an Instant Messaging application). Other applications may represent processes that were not launched responsive to the user attempting to retrieve information from the Internet. For example, virus scanning software may attempt to access a new definition file and an Operating System updating engine may attempt to load a new patch. Still, other applications generating communications activities may include unauthorized and undesired code segments (e.g., spyware and malware).

Identifying the application may include generating a traffic profile for the communications activity (e.g., TCP port number, application layer parameter) and looking up the traffic profile in a list of applications. The list of applications may include a traffic profile for registered applications. The client may identify the application as the listed application when the traffic profile for the listed activity appears similar to the traffic profile for one of the applications in the list of applications. Thus, use of TCP port 80 may be used indicate that a web browser is being used.

Identifying the applications also may include identifying how an application is being used. For example, the use of a particular URL ("Uniform Resource Locator") within an HTTP ("Hyper Text Transfer Protocol") request may be used to indicate that a mail operation is being performed when a webmail resource is being accessed (e.g., mail.aim.com) and that a searching operations is being performed while a search engine is being accessed (e.g., search.aol.com). More granular type of application use may be identified. For example, a request to send an email message from an email application may be identified by recipient identifier or urgency. Thus, an email message addressed to a key business partner may be identified as critical email message while a message addressed to a co-worker regarding administrative procedures within the office may be identified as non-critical.

Identifying an application may include accessing information indicative of which communications represent user actions. For example, a communications configuration may indicate that a range of protocols are used by an application and that a subset of protocols within the range of protocols represents user activities. In contrast, other communications activity may be identified as originating from system programs (e.g., operating system updates) or from unidentified or unauthorized programs (e.g., spyware).

The client accesses a communications configuration associated with the application. (430). The communications configuration indicating how the application may access the network. The client may retrieve a communications script that selectively activates a communications network. For example, in order to avoid communication costs imposed by use of a high speed wireless network, a communications configuration may only establish network connectivity for email communications to priority recipients and for web access to a secure extranet.

Network connectivity is selectively established based on the communications configuration. (440). For example, the client may establish a high speed wireless connection to access an electronic mail server to exchange messages with a priority recipient and establish a dial up connection with an access server to access a secure extranet. The application is enabled to access the network to support the communications activity. (450). Thus, an inspection engine may allow a web browser to access a specified web site or an email application to send messages to a specified recipient.

Figure 4A:
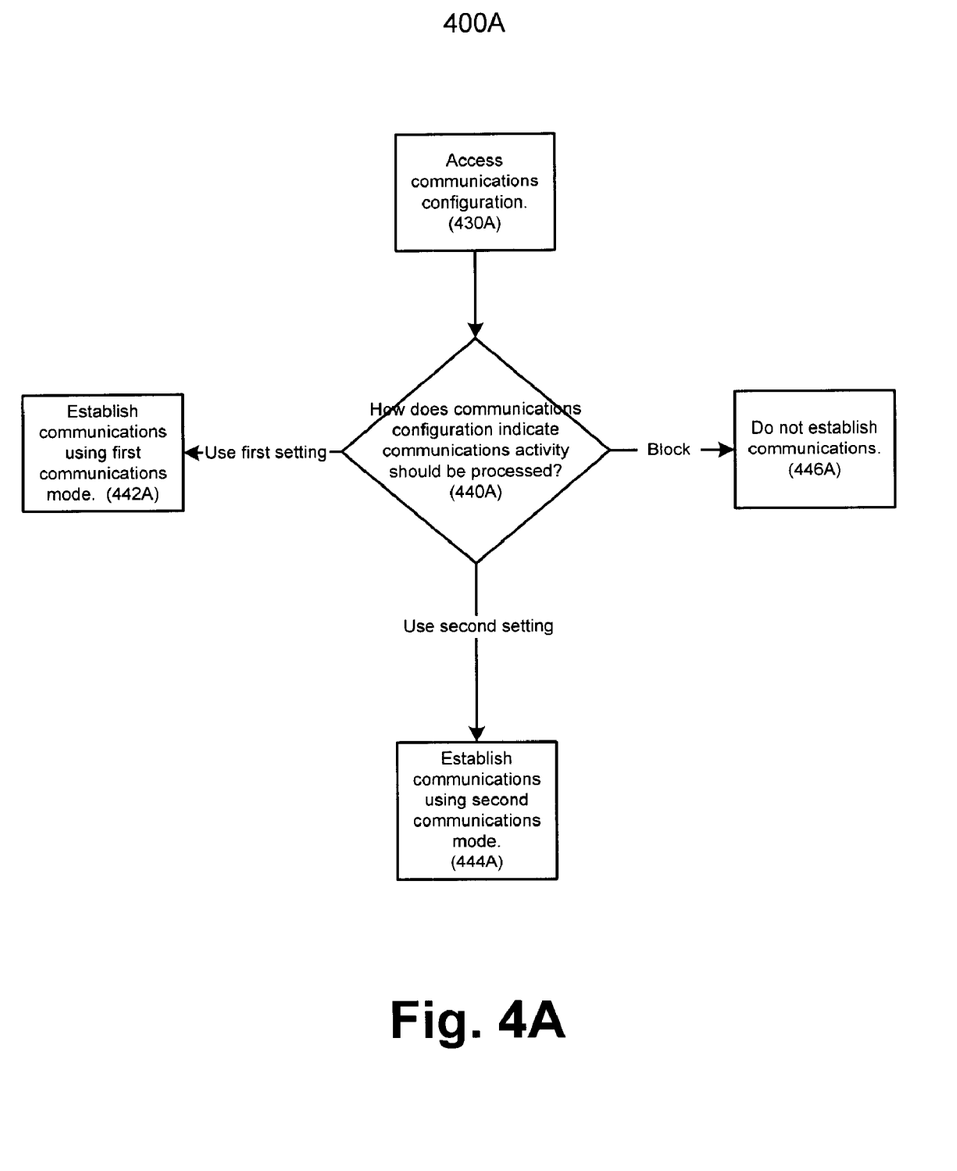

FIG. 4A is a flow chart 400A of a process illustrating how network connectivity may be selectively established so that an application is enabled to access the network to support the communications activity. Generally, the operations shown in flow chart 400A illustrate one implementation of the operations shown in operations 440 and 450 shown in FIG. 4. However, other operations may be performed to selectively establish network connectivity.

Initially, a client accessed a communications configuration. (430A). The client then determines how the communications configuration indicates that the communications activity should be processed (440A). In a first setting, the communications configuration indicates that communications should be established using a first communications mode. (442A). For example, the first setting may indicate that a broadband circuit-switched wireless network should be used. In a second setting, the communications configuration indicates that communications should be established using a second communications mode. (444A). For example, the second setting may indicate that dial up landline network should be used. In a third setting, the communications configuration indicates that communications should be blocked. (446A).

Although these operations were described as being performed independent of one another, an application may be selectively enabled to take advantage of a communications capability that has been established for another application. For example, although a particular communications configuration may indicate that a first program using a first setting should be blocked, the first program may be allowed to rely on network connectivity that has been established for an authorized second program. Alternatively or in addition, a first setting may be used on a first occasion when no other programs have activated the communications capability while a second setting may be used on a second (and different occasion). In yet another implementation, a first program may use a first communications mode (e.g., a low bandwidth interface) while a second program simultaneously uses a second communications mode (e.g., a high bandwidth interface).

Figure 5:
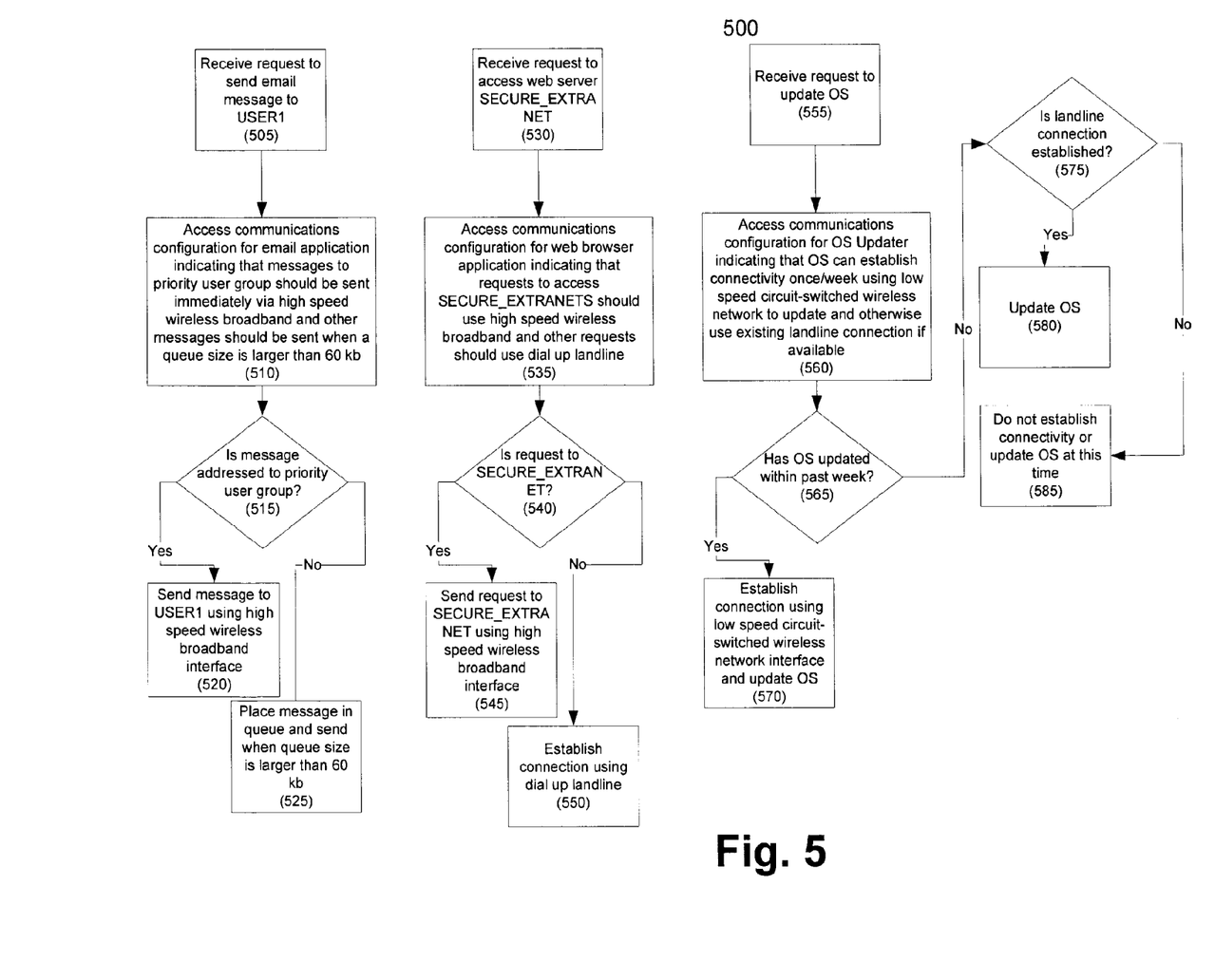

FIG. 5 is a flow chart 500 of a process by which network connectivity is selectively established. Initially, a client receives a request to an email message to USER1. (505). The client accesses a communications configuration for an email application indicating that messages to priority user group should be sent immediately via high speed wireless broadband and other messages should be sent when a queue size is larger than 60 kb. (510). The client determines if the email message to USER1 is addressed to a priority user group. (515). More precisely, the client determines if USER1 belongs to the priority user group. If so, the client sends the message to USER1 using a high speed wireless broadband interface. (520). If not, the client places the message in a queue and sends the message after the queue size is larger than 60 kb. (525).

Alternatively or in addition, the client receives a request to access web server SECURE_EXTRANET. (530). The client then accesses a communications configuration for a web browser application indicating that requests to access SECURE_EXTRANET should use high speed wireless broadband and other requests should use dial up landline. (535). The client then determines if the request is to access SECURE_EXTRANET. (540). If so, the client sends a request to SECURE_EXTRANET using high speed wireless broadband interface. (545). If not, the client establishes a connection using dial up landline. (550).

In yet another operation, the client may include an operating system (OS) updating code segment that attempts to keep the client's OS current. As a result, the OS updating code segment periodically polls an OS updating server to determine if OS updates are available. In support of this, the client receives a request to update the OS. (555). The client accesses a communications configuration for the "OS Updater" indicating that OS can establish connectivity once/week using low speed circuit-switched wireless network to update and otherwise use existing landline connection if available. (560). The client determines if the OS updated within past week. (565). If so, the client establishes a connection using a low speed circuit-switched wireless network interface and updates the OS. (570). If not, the client determines if a landline connection has been established. (575). If a landline connection has been established, the OS is updated. (580). If not, connectivity is not established and the OS is not updated at this time. (585).

Other implementations are within the scope of the following claims. For example, although many of the operations were describes as being performed on a personal computer, the operations also may be performed on other devices, such as a wireless phone. In another implementation, a reconfigurable communications interface is dynamically configured based on the communications configuration that is accessed. For example, a wireless network interface may be configured to operate in different modes and/or bandwidths. Each mode may be associated with a difference performance capability, range, and/or cost. In one example, the communications configuration instructs the client to use a low bandwidth wireless packet mode to exchange instant messages in order to reduce costs while instructing the client to use a high bandwidth mode on the same wireless (and more expensive) for mission critical communications.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications to the specific examples described above also are contemplated.

What is claimed is:

1. A method of selectively establishing network connectivity, the method comprising:
monitoring, on a client, communications activity incident to accessing a network, the communications activity including a request to access the network;
identifying, on the client, an application associated with the communications activity;
determining, on the client, that the communications activity for the application was initiated in response to user interaction with the client and is separate and distinct from an ambient background process;
accessing, on the client, a communications configuration associated with the application, the communications configuration indicating how the application is configured to access the network by performing operations that include:
accessing a first setting to be used in response to identifying a first program as the application,
accessing a second setting to be used in response to identifying a second program as the application, establishing network connectivity using the first setting in response to identifying communications activity related to the first program, and establishing network connectivity using the second setting that is different than the first setting in response to identifying communications activity related to the second program;

selectively establishing, on the client, network connectivity based on the determination that the communications activity for the application was initiated in response to user interaction with the client and is not an ambient background process that generates a communications requirement in response to something other than user interaction; and enabling, on the client, the application to access the network to support the communications activity.

2. The method of claim 1 wherein identifying the application includes identifying a resource that originated the communications activity.

3. The method of claim 1 wherein identifying the application includes identifying a remote resource to which the communications activity is intended as a destination.

4. The method of claim 1 wherein accessing the first setting includes accessing a first instruction specifying that connectivity should not be established for the first program and accessing the second setting includes accessing a second instruction specifying that connectivity for the second program should be established using a first communications mode.

5. The method of claim 1 wherein accessing the first setting includes accessing a first instruction specifying that connectivity should be established for the first program using a first communications mode and accessing the second setting includes accessing a second instruction specifying that connectivity for the second program should be established using a second communications mode that is different than the first communications mode.

6. The method of claim 1 wherein establishing network connectivity using the first setting and establishing network connectivity using the second setting includes establishing network connectivity using the first setting at a first time and establishing network connectivity using the second setting at a second time that is different than the first time.

7. The method of claim 1 further comprising enabling the first program to access the network based on network connectivity that has already been established for the second program.

8. The method of claim 1 further comprising blocking the first program from accessing the network based on network connectivity that has already been established for the second program.

9. The method of claim 1 further comprising blocking network connectivity for the application based on a determination that the communications configuration does not support establishing network connectivity.

10. The method of claim 1 further comprising using a default configuration based on a determination that the communications configuration for the application cannot be accessed.

11. The method of claim 3 wherein using the default configuration includes blocking network connectivity based on a determination that the communications configuration for the application cannot be accessed or the application cannot be identified.

12. The method of claim 1 wherein establishing the network connectivity includes establishing the network connectivity for a specified duration.

13. The method of claim 1 wherein monitoring the communications activity includes identifying a protocol supporting the communications activity.

14. The method of claim 13 wherein identifying the application includes:

receiving an indication of which protocols are being used and associated with a user activity; and using the indication of which protocols are being used to identify the application.

15. The method of claim 1 wherein the application includes a user application and further comprising determining whether the communications activity represents user actions within the user application.

16. The method of claim 15 wherein determining whether the communications activity represents user actions within the user application includes determining whether the user actions generate visual feedback useful to the user in perceiving the user application.

17. The method of claim 1 wherein selectively establishing network connectivity based on the communications configuration includes selecting a specified communications interface from among several communications interfaces based on an application of a rule in the communications configuration specifying that the specified communications interface should be used to support the communications activity.

18. A system on a storage memory configured to selectively establish network connectivity, the system comprising:

a processor;

a first communications controller structured and arranged to monitor, on a client, communications activity incident to accessing a network, the communications activity including a request to access the network;

a profile controller structured and arranged to identify, on the client, an application for the communications activity;

an access controller structured and arranged to:

determine, on the client, that the communications activity for the application was initiated in response to user interaction with the client and is separate and distinct from an ambient background process; and access, on the client, a communications configuration for the application, the communications configuration indicating how the application is configured to access the network by performing operations that include: accessing a first setting to be used in response to identifying a first program as the application, accessing a second setting to be used in response to identifying a second program as the application, establishing network connectivity using the first setting in response to identifying communications activity related to the first program, and establishing network connectivity using the second setting that is different than the first setting in response to identifying communications activity related to the second program;

an establishment controller structured and arranged to selectively establish, on the client, network connectivity based on the determination that the communications activity for the application was initiated in response to user interaction with the client an applications controller structured and arranged to enable, on the client, the application to access the network to support the communications activity.

19. The system of claim 18 wherein the establishment controller is structured and arranged to block network connectivity for the application based on a determination that the communications configuration does not support establishing network connectivity.

20. The system of claim 18 wherein the establishment controller is structured and arranged to use a default configuration based on a determination that the communications configuration for the application cannot be accessed.

21. The system of claim 20 wherein using the default configuration includes blocking network connectivity based on a determination that the communications configuration for the application cannot be accessed or the application cannot be identified.

22. The system of claim 21 wherein the establishment controller is structured and arranged to establish the network connectivity for a specified duration.

23. The system of claim 21 wherein the first communications controller is structured and arranged to identify a protocol supporting the communications activity.

24. The system of claim 23 wherein identifying the application includes:
   receiving an indication of which protocols are being used and associated with a user activity; and
   using the indication of which protocols are being used to identify the application.

25. The system of claim 18 wherein the application includes a user application and wherein the profile controller is structured and arranged to determine whether the communications activity represents user actions within the user application.

26. The system of claim 25 wherein determining whether the communications activity represents user actions within the user application includes determining whether the user actions generate visual feedback useful to the user in perceiving the user application.

* * * * *